(12) United States Patent
Conner et al.

(10) Patent No.: US 8,722,176 B2
(45) Date of Patent: *May 13, 2014

(54) QUALITY COMMUNICATIVE INDICIA FOR PAPER TOWEL PRODUCTS

(75) Inventors: Richard Lee Conner, Loveland, OH (US); Laura Kathleen Weber, Crescent Springs, KY (US); Jeffrey William Winkle, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,622

(22) Filed: Aug. 24, 2012

(65) Prior Publication Data

US 2012/0318693 A1 Dec. 20, 2012

Related U.S. Application Data

(63) Continuation of application No. 11/891,433, filed on Aug. 10, 2007, now Pat. No. 8,273,446.

(51) Int. Cl.
*A47K 10/16* (2006.01)
(52) U.S. Cl.
USPC ......... 428/195.1; 428/219; 428/220; 428/535
(58) Field of Classification Search
USPC ....................................................... D20/29
See application file for complete search history.

(56) References Cited

U.S. PATENT DOCUMENTS

| | | | |
|---|---|---|---|
| 6,162,327 A | 12/2000 | Batra et al. | |
| 2004/0191486 A1 | 9/2004 | Underhill et al. | |
| 2005/0121347 A1 | 6/2005 | Hanson | |
| 2006/0144736 A1 | 7/2006 | Goodrich et al. | |
| 2007/0235263 A1 | 10/2007 | Legault et al. | |
| 2008/0010146 A1 | 1/2008 | Gillespie et al. | |
| 2008/0202965 A1 | 8/2008 | Duval et al. | |
| 2008/0245491 A1 | 10/2008 | Knobloch et al. | |
| 2009/0041998 A1 | 2/2009 | Conner et al. | |
| 2009/0056435 A1 | 3/2009 | Duval et al. | |
| 2009/0056891 A1 | 3/2009 | Wiwi et al. | |
| 2009/0057171 A1 | 3/2009 | Roetker et al. | |

FOREIGN PATENT DOCUMENTS

GB 1499146 1/1978

OTHER PUBLICATIONS

ScotTissue Towels Advertisement. Housewives League Magazine, vol. V, No. 3, (1915); pp. 1-42.*
"Retail Signage . . . Tips for Increasing Sales & Service". DS Marketing Solutions, (2006); pp. 1-3.*

* cited by examiner

*Primary Examiner* — Prashant J Khatri
(74) *Attorney, Agent, or Firm* — Roddy M. Bullock; Sarah M. Crush

(57) ABSTRACT

A method of communicating qualities to a consumer of a paper towel product where the method involves: providing a paper towel product having one or more qualities, identifying one or more communicative elements having one or more of the same qualities of the paper towel product, selecting a first communicative element by applying one or more selective criteria to the one or more communicative elements, providing a visual representation of the paper towel product and a visual representation of the first communicative element, and using the visual representations of the paper towel product and first communicative element to provide a quality communicative indicium.

8 Claims, 4 Drawing Sheets

QUALITY COMMUNICATIVE INDICIA FOR PAPER TOWEL PRODUCTS

CROSS REFERENCE TO RELATED APPLICATIONS

This application is a continuation application of U.S. application Ser. No. 11/891,433, filed on Aug. 10, 2007 now U.S. Pat. No. 8,273,446.

FIELD OF THE INVENTION

This invention relates to packaging for a paper towel product wherein the packaging has one or more indicia that conveys a quality of the paper towel product by showing a simulated representation of the paper towel product wherein the simulated representation shows that the paper towel product as though the paper towel product is constructed of a material that is well-known to have the same quality as the paper towel product.

BACKGROUND OF THE INVENTION

Product packaging impacts product visibility to the customer and consequently impacts revenues derived for product sales. Because of this relationship, manufacturers and retailers have a vested interest in displaying product packages that have the most effective communication indicia as is possible. That being said, providing effective communicative indicia on the product packages may provide obstacles for a manufacturer. For instance, ensuring that the communicative indicia on the product package does not take up an unduly large amount of surface area, or is simple enough to understand so as to not detract consumers from the product itself, yet effectively conveys a particular message, are some problems that a manufacturer may encounter.

Some types of products have certain qualities or benefits that are desirable. For example, with family care products, such as absorbent paper products, a highly desirable quality is to have a cloth-like feeling. Much work has gone into the prior art to develop actual paper products that have, or appear to have, such quality. However, even if a product has such a quality it is still necessary to convey such information to the consumers.

An exemplary prior art methodology of conveying the presence of certain qualities or benefits includes advertising or packaging that includes text printed on the product packaging that touts the improved features. However, packaging for prior art absorbent paper products, particularly paper towel products, tends to use a vast amount of text to convey qualities and benefits to the consumers. The text tends to be distracting to the overall visual effect of the packaging and does not take full advantage of the space on the product packaging that it is printed on. It can sometimes be the case that the text that conveys the message is generic in form, may be verbose, and does not separate itself from other packages in the retail space which may have similar messages. This being the case, the overall impact of such indicia on the product package may be dramatically reduced.

Another exemplary prior art method for conveying the presence of certain qualities or benefits is to provide consumers with samples of the product for them to use and experience at home or in store. However, this method tends to be somewhat costly, can be difficult to coordinate, and is limited in the number of media that can be used.

Thus, there exists the need for a method of doing business that provides manufacturers with the ability to convey the existence of certain benefits to the consumers quickly and effectively and that is compatible with a wide variety of media.

SUMMARY OF THE INVENTION

In one embodiment, the present invention relates to a method of communicating qualities to a consumer of a paper towel product, the method comprising the steps of: (1) providing a paper towel product having one or more qualities; (2) selecting one or more of the one or more qualities of the absorbent paper product; (3) identifying one or more communicative elements wherein each of the one or more communicative elements represents one or more of the one or more selected qualities of the absorbent paper product; (4) applying one or more selective criteria to the one or more communicative elements and selecting a first communicative element; (5) providing a visual representation of the absorbent paper product; (6) providing a visual representation of the first communicative element; and (7) using the visual representation of the absorbent paper product and the visual representation of the first communicative element to provide a quality communicative indicium.

In another embodiment, the present invention relates to a quality communicative indicium for a method of communicating qualities to a consumer of a paper towel product, the quality communicative indicium comprising: (a) a visual representation of a paper towel product and a visual representation of a cloth; and (b) wherein the visual representation of the cloth is represented integrally represented in the visual representation of the absorbent paper product.

In another embodiment, the a paper towel product for use with a method of communicating qualities to a consumer of a paper towel product wherein the paper towel product comprises: (a) an absorbent paper product comprising two or more plies having a Compression Slope of from about 7 to about 30; a basis weight of from about 20 lbs/3000 ft$^2$ to about 50 lbs/3000 ft$^2$; a Wet Caliper of from about 18 mils to about 40 mils; and a Flex Modulus of from about 0.1 to about 1.2; (b) product packaging comprising a quality communicative indicium for a method of communicating qualities to a consumer of an absorbent paper product, the quality communicative indicium comprising a quality communicative indicium comprising a visual representation of a paper towel product and a visual representation of a cloth wherein the visual representation of the cloth is integrally represented in the visual representation of the absorbent paper product.

DETAILED DESCRIPTION OF THE INVENTION

Figure 1:
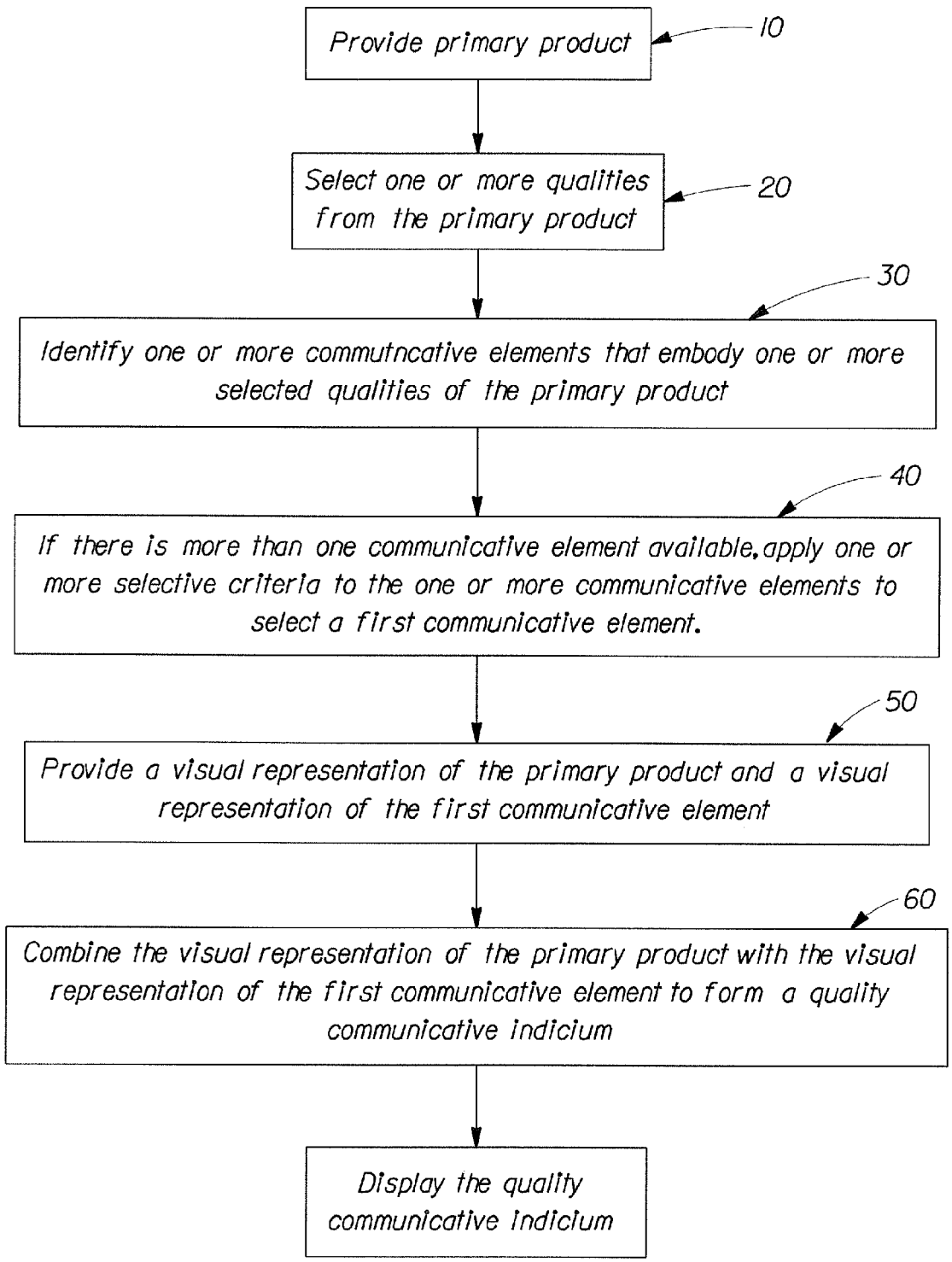
FIG. 1 is a flow diagram that illustrates one embodiment of the method of marketing as may utilize the present invention

As defined herein, "product packaging" refers to the outer wrap or container in which the consumer product is held while in the retail space. In one embodiment product packaging may be selected from the group consisting of: boxes, shrink wrap, outer wrap, bags, pouches, containers, bottles, the like, and combinations thereof.

As defined herein, "primary product" refers to the product that is being described by one or more quality communicative indicia. In one embodiment, a primary product is a paper towel product.

As defined herein, "quality" refers to a characteristic that is associated with a product that may, or may not be, normally associated with a product, but which the product may possess nonetheless. A quality may be expressed descriptively. In an exemplary embodiment, a quality may be described in terms of: absorbency, softness, caliper, biodegradability, hygiene, anti-microbial benefits, luxury, scent, moisturizing qualities, strength, the like and combinations thereof. Texture is the visual or tactile surface characteristics and appearance of the absorbent paper product. Absorbency is the characteristic of the paper web that facilitates the take up and retention of fluids, particularly water, aqueous solutions, and aqueous suspensions. In addition, the absolute quantity of a fluid that a fixed amount of an absorbent paper product will hold, and the rate at which a fixed amount of an absorbent paper product web will absorb the fluid are also primary benefits of an absorbent paper product. Softness is a pleasing tactile sensation the user perceives as the paper is crumpled in their hand and is contacted to various portions of the anatomy. Caliper is the thickness of the absorbent paper product. Biodegradability is the tendency of the paper to be broken down into innocuous products by the action of micro-organisms. Hygiene is the ability of the product to perform functions that are conducive to health or cleanliness. Anti-microbial benefits include the ability of the product to remove or reduce the presence of harmful micro-organisms. Luxury is the adding of pleasure, comfort, satisfaction, or ease but not being necessary. Scent refers to the effluvia from a substance that affects the sense of smell. Moisturizing qualities refer to the ability of the product to impart lotion or other skin-benefiting agents onto the user. Strength is the ability of a paper web to retain its physical integrity during use. Alternatively, a quality may be expressed comparatively. In other words, a quality may be described in terms of other products or articles. For example, an absorbent paper product may be described, in an exemplary embodiment, as being fabric-like. Fabric like includes, but is not limited to: cloth-like, cotton-like, silk-like, flannel-like, sponge-like, denim-like, spandex-like, and combinations thereof.

As defined herein, "communicative element" refers to an item, object, product, or some representation thereof, which is known to possess one or more qualities of the primary product. As exemplified supra, a communicative element may be, but is not limited to: cloth, cotton, silk, flannel, sponge, denim, spandex, and combinations thereof. In another embodiment, a communicative element may be: metal, mesh, chain, netting, cable, and combinations thereof.

Figure 2A:
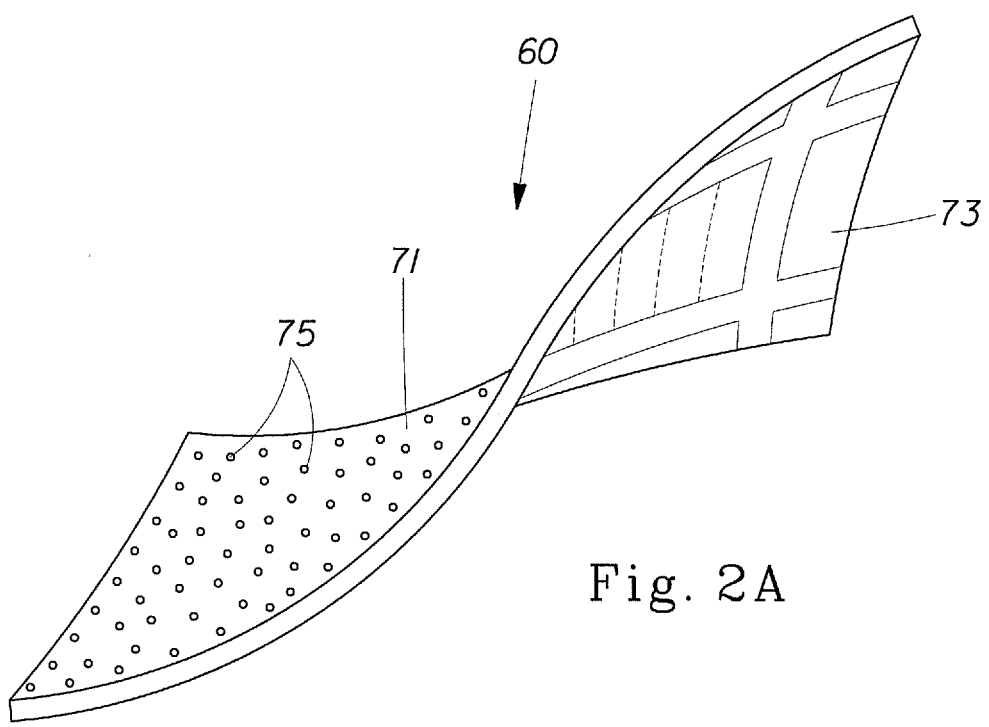
FIG. 2A is an exemplary embodiment of a quality communicative indicium as may utilize the present invention.
Figure 2B:
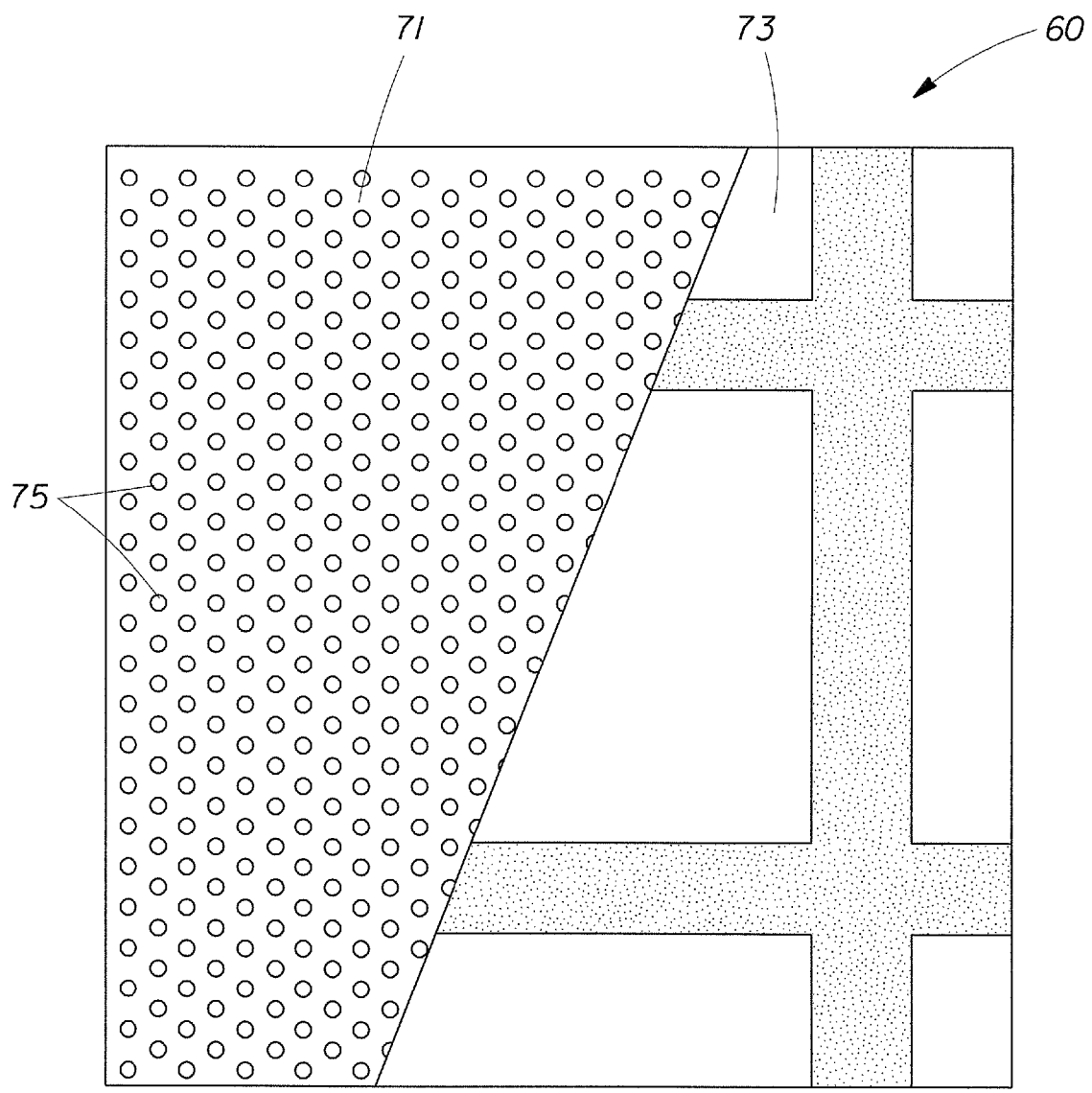
FIG. 2B is an exemplary embodiment of a quality communicative indicium as may utilize the present invention.

As defined herein, "quality communicative indicium" refers to any indicium or visual indicator that can communicate a benefit or property of the primary product. For example, quality communicative indicia may include, but are not limited to symbols, pictures, photographs, trademarks, graphics, the like and combinations thereof. In one embodiment, a quality communicative indicium comprises one or more communicative elements. In some embodiments, the quality communicative indicium may be represented integrally into the primary product. In other words, in some embodiments the quality communicative indicium is visually represented as being a part of the primary product itself. An example of a quality communicative indicium that is represented integrally into a primary product may be as follows: a primary product such as an absorbent paper product paper towel may be represented by a drawing of a square or rectangular sheet having an embossment pattern that is similar to that of the actual absorbent paper product. If the quality that the paper towel possesses is that the paper towel is fabric-like or cloth-like, then the quality communicative indicium may be a visual representation of a piece of fabric or cloth. The visual representation of the piece of fabric or cloth (quality communicative indicium) may then be shown as a part of the visual representation of the primary product itself. In one embodiment, the drawing of a square sheet which has drawings of embossments can be redrawn such that the square now has half of the sheet with drawings of embossments, while the other half of the sheet may have drawings of a pattern that may be common to cloth products—for example, a gingham pattern, toile, etc. In another embodiment, one half of the sheet may have drawings of a pattern that may be common to fabrics—for example, a herringbone, houndstooth, pique, etc. As a result, the quality communicative indicium may be represented integrally as being a part of the primary product. Examples of quality communicative indicia which are integrally visually represented into the primary product (absorbent paper product) are illustrated in FIGS. 2A-B and discussed infra.

As defined herein, "selective criteria" refers to any factor(s) that may be applied to two or more potential communicative elements to decide which communicative element is better suited for use in a quality communicative indicium.

As defined herein, "cloth" refers to a pliable material made usually by weaving, felting, or knitting natural or synthetic fibers and filaments. Nonlimiting examples of cloths in everyday use include: dish towels, tablecloths, and the like.

As defined herein, "visually similar" means having an appearance of one object that is comparable in shape, pattern, texture, to another object.

Quality Communicative Indicium

In one embodiment, the present invention to a quality communicative indicia that may be used with a method of communicating the qualities of a primary product. In one embodiment, the quality communicative indicia may be printed on the product packaging of the primary product. In another embodiment, the quality communicative indicium may be displayed on a billboard or placard and not necessarily on the product packaging.

FIG. 1 is flow chart illustrating the steps of an exemplary embodiment of the present business method of providing a quality communicative indicium for a product. A primary product 10 is produced having one or more qualities 20. One or more of the one or more qualities 20 are identified from the primary product 10.

Applying a Selective Criterion

Example 1

In an exemplary embodiment, a paper towel product (primary product 10) has the qualities 20 of having a smooth texture, heavy, thick, and conveys test-users a sense of warmth. A communicative element 30 may then be chosen that will illustrate the one or more qualities 20 associated with the exemplary primary product 10. For example, without being limited by theory, it is thought that flannel fabric is well-known to consumers for possessing, among other qualities, the qualities 20 of having a smooth texture, heavy, and thick and is something that a person would wear to stay warm. Therefore, because flannel is a well known object that possesses one or more qualities 20 that primary product 10 possesses, flannel is a possible choice for the communicative element 30. Without being limited by theory, it is thought that wool is well-known to consumers for being heavy, thick and is something that a person would wear to stay warm. Therefore, wool is also a well known object that possesses one or more qualities 20 that the primary product possesses 10 and is also a possible choice for the communicative element 30.

Because there are two possible choices for the communicative element 30, a selective criterion 40 may be used to pick which communicative element is best suited for the quality communicative indicium 40. For example, a selective criterion may be to pick the selective criterion which has the highest number of qualities 20 in common with the primary product 10. Comparing wool with flannel and without wishing to be limited by theory, it is thought that flannel possesses the additional quality of having a smooth texture that wool does not possess. Thus, applying the selective criterion 40 of highest number of qualities in common with the primary product, flannel is a better choice than wool for being the communicative element 30.

Applying a Selective Criterion

Example 2

In an exemplary embodiment, a paper towel product (primary product 10) has the qualities 20 of being "soft" and "absorbent." A communicative element 30 may then be chosen that will illustrate the one or more qualities 20 associated with the exemplary primary product 10. Two nonlimiting communicative elements could then be a cloth and a sponge. Without wishing to be limited by theory, it is thought that a cloth is known to be soft and absorbent whereas a sponge is known to be absorbent, but not necessarily soft. Thus, applying the selective criterion 40 of highest number of qualities 20 in common with the primary product 10, the cloth is chosen as the communicative element because it embodies 2 qualities of the primary product whereas the sponge only embodies 1 quality.

Applying a Selective Criterion

Example 3

In an exemplary embodiment, a paper towel product (primary product 10) has the qualities 20 of being "wring-able" (able to be squeezed and/or twisted to expel liquids) "strong" and "absorbent." A communicative element 30 may then be chosen that will illustrate the one or more qualities 20 associated with the exemplary primary product 10. Two nonlimiting communicative elements could then be a cloth and a sponge. Without wishing to be limited by theory, it is thought that a cloth is known to be wring-able, strong and absorbent and that a sponge is also known to be wring-able, strong and absorbent. Thus, applying a selective criterion 40 such as highest number of qualities 20 in common with the primary product 10 will not successfully select a communicative element 30 because both a cloth and a sponge have three qualities 20 in common with the primary product 10.

In the case of a tie (as exemplified supra), then one or more selective criteria 40 may be applied to choose from the possible communicative elements 30 or the qualities 20 of the primary product 10 may be expanded further and the first selective criterion 40 may be reapplied. For example, in the current example, the paper towel is described as having the quality of being strong. Strength can be further expanded to be described as tensile-strength. In this case, without wishing to be limited by theory, it is thought that a cloth is known to have a strong tensile strength whereas a sponge is not. Thus, reapplying the selective criteria 40 of highest number of qualities 20 in common with the primary product 10, the cloth is now chosen as an appropriate communicative element 30.

Alternatively, any number of other selective criteria 40 may be applied. For example, nonlimiting examples of alternate selective criteria 40 include: more aesthetically pleasing, easiest to execute, alphabetical order, and combinations thereof.

Applying a Selective Criterion

Example 4

In an exemplary embodiment, a paper towel product (primary product 10) has the qualities 20 of being "stretchable." A communicative element 30 may then be chosen that will illustrate the one or more qualities 20 associated with the exemplary primary product 10. One nonlimiting communicative element could then be a piece of spandex fabric which is being stretched. Without wishing to be limited by theory, it is thought that spandex fabric is very stretchable and by showing that it is being stretched indicates that the fabric is, in fact, spandex. Since there is only one communicative element 30 at issue, the selective criterion 40 that may be applied is simply to select the lone communicative element 30.

Without wishing to be limited by theory, it is thought that for consumers to more easily identify the message being conveyed by the quality communicative indicium, then the consumer should be able to identify the primary product 10 and communicative element 30 illustrated in the quality communicative indicium. For example, if a primary product 10 is a paper towel product with the quality of being "flannel like" and the selected communicative element 30 is flannel fabric, then to have consumers identify the primary product 10 and the chosen communicative element 30, some representation of the communicative element 30 should be made. A visual representation 50 can be made of both the paper towel product (primary product 10) and the flannel (communicative element 30). In one embodiment for the visual representation of a paper towel product (primary product 10) a visual representation 50 of embossments, or in another embodiment, the same embossing pattern as on the actual paper towel product, may be used. In one embodiment, for a communicative element 30 such as flannel, then a visual representation 50 may be made of flannel. In one embodiment the visual representations 50 can be made by, but not limited to, drawings, photographs, pictures, the like and combinations thereof. For example, without wishing to be limited by theory it is thought that a plaid pattern is well known and commonly associated with flannel. Therefore, an exemplary visual representation 50 of flannel would be a drawing that included a plaid pattern on it. In an embodiment, for a communicative element 30 like cloth, a pattern or some other indicator, that is common with a piece of cloth (i.e., gingham pattern, toile pattern, striped pattern, texture, etc.) may be chosen for the visual representation 50 to indicate that the communicative element 30 is a piece of cloth.

Having a primary product 10 and having chosen a communicative element 30, a quality communicative indicium 60 may be made by visually linking the primary product 10 with the communicative element 30. In one embodiment, the primary product 10 and communicative element 30 may be visually linked by providing a visual representation 50 of the primary product 10 and a visual representation 50 of the communicative element 30 and using the two visual representations 50 to create a single quality communicative indicium 60 that has aspects of both visual representations 50 wherein the visual representation 50 of the primary product 10 and the visual representation 50 of the communicative element make two halves of a single quality communicative indicium 60.

The quality communicative indicium 60 may then be displayed 70 on, but not limited to, the product packaging or on placards, signs, billboards, shopping carts, lane dividers, advertisements, the like and combinations thereof. Further, while it may be highly beneficial to display the quality communicative indicium in a retail location where the primary product may be sold, it is not necessary to limit the placement of quality communicative indicia to a retail location. For example, a quality communicative indicium may be displayed on a billboard near a road or on an advertisement that is mailed to the consumers' homes.

FIG. 2A is an exemplary embodiment of a quality communicative indicium 60 of the present invention. In this exemplary embodiment the primary product is an absorbent paper product having a quality of being cloth-like. Referring to FIG. 2A, the quality communicative indicium 60 comprises a visual representation 50 of the primary product 10 and a visual representation 50 of the communicative element 30 (a piece of cloth). In this case, the visual representation 50 of the primary product 10 and communicative elements 50 are drawings. In the exemplary embodiment the quality communicative indicium 60 comprises an absorbent paper product having a first part 71 and a second part 73. In some embodiments the first part 71 and the second part 73 are simultaneously visible. In the exemplary embodiment the first part 71 and second part 73 are visually represented as a first side and second side (respectively) of a sheet of an absorbent paper product. It should be understood that it is not necessary for the first part 71 and second part 73 of the quality communicative indicium 60 to be two different sides (as drawn) of the primary product in order to create a visual link between the primary product and quality communicative indicium. In the exemplary embodiment shown in FIG. 2A, the sheet of absorbent paper product (quality communicative indicium 60) is twisted to show the first part 71 and the second part 73.

FIG. 2B shows another exemplary embodiment of a quality communicative indicium 60 of the present invention. The quality communicative indicium 60 comprises a visual representation 50 of a primary product (absorbent paper product) and a visual representation 50 of the communicative element 30 (cloth) wherein the primary product comprises an absorbent paper product having a first part 71 and a second part 73. In one embodiment the first part 71 can be from about 25% to about 75% of one side of the visual representation 50 of the primary product (as drawn) and the second part 73 can be from about 25% to about 75% of the same side of the quality communicative indicium 60.

The visual representations 50 of the present invention quality communicative indicium 60 can be illustrated by any means known in the art such as, but not limited to, drawings, photographs, paintings, computer graphics, the like, and combinations thereof. In the exemplary FIGS. 2A-B the absorbent paper product (primary product 10) is shown as such by drawing a pattern comprising embossments 75 on the first part 71. Any other feature that a consumer would understand as being present in the primary product can be drawn onto the quality communicative indicium 60 so that it is understood that the quality communicative indicium 60 relates to that primary product 10. In one embodiment the quality 20 that is present in the primary product that 10 is being conveyed by the quality communicative indicium 60 can be depicted by drawing any feature that a consumer would understand as representing that quality. For example, in FIGS. 2A-B the exemplary quality communicative indicium 60 represents an absorbent paper product (the primary product) that has a cloth-like texture, softness and strength. In the exemplary embodiment, the second part 73 of the quality communicative indicium 60 is visually represented 50 through a communicative element 30 that represents a piece of cloth. Such a representation may be made by drawing a pattern that is commonly used on cloth napkins on the second part 73 of the quality communicative indicium 60. Without wishing to be limited by theory, it is thought that by using a single indicium to indicate one or more qualities that a primary product may possess by associating that primary product with an item, object, or other product that is known to embody one or more of these qualities, then this simplified form of communication will be more easily received by consumers.

Figure 3:
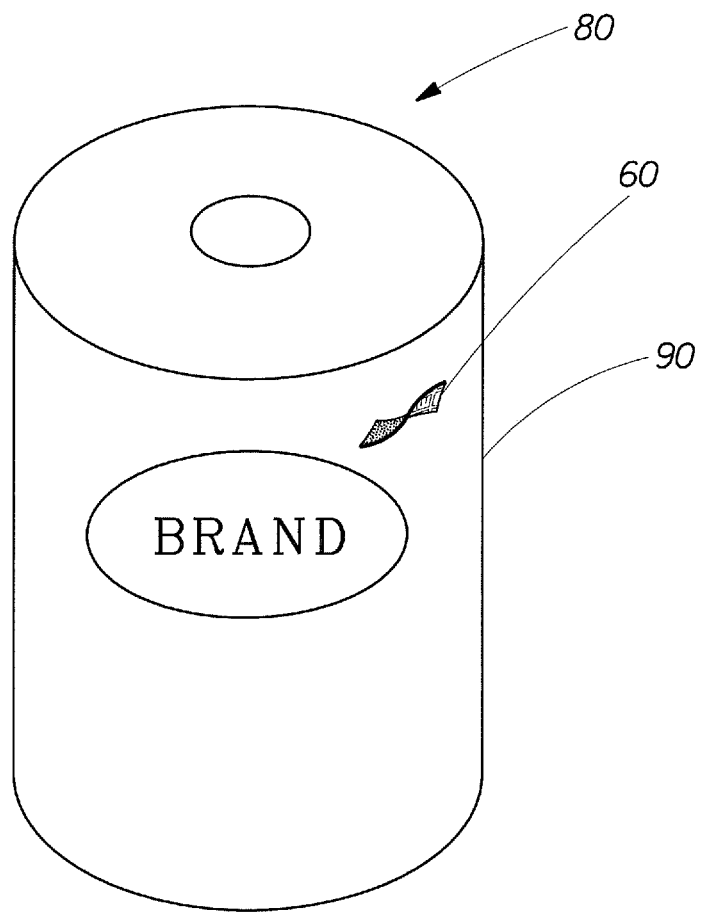
FIG. 3 is an exemplary embodiment of a product package comprising a roll of absorbent paper product and a quality communicative indicium as may utilize the present invention.

FIG. 3 is an exemplary embodiment of a roll of an absorbent paper product 80 in product packaging 90 wherein the product packaging comprises a quality communicative indicium 60 of FIG. 2A.

Absorbent Paper Product

As defined herein, "absorbent paper product" refers to any formed, fibrous structure paper products, traditionally, but not necessarily, are used for drying, cleaning, and wiping purposes. Absorbent paper products comprise paper making fibers. Absorbent paper products include products such as paper towels, facial tissues, sanitary tissues, and the like.

An absorbent paper product may comprise a variety of paper making fibers, such as, but not limited to, natural fibers, synthetic fibers, as well as any other suitable fibers, starches, and combinations thereof. Paper making fibers useful in the present invention include cellulosic fibers commonly known as wood pulp fibers. Applicable wood pulps include chemical pulps, such as, but not limited to, Kraft, sulfite and sulfate pulps, as well as mechanical pulps including, groundwood, thermomechanical pulp, chemically modified, and the like. Chemical pulps may be used in tissue towel embodiments since they are known to those of skill in the art to impart a superior tactical sense of softness to tissue sheets made therefrom. Pulps derived from deciduous trees (hardwood) and/or coniferous trees (softwood) can be utilized herein. Such hardwood and softwood fibers can be blended or deposited in layers to provide a stratified web. Exemplary layering embodiments and processes of layering are disclosed in U.S. Pat. Nos. 3,994,771 and 4,300,981. Additionally, fibers derived from wood pulp such as cotton linters, bagesse, and the like, can be used. Additionally, fibers derived from recycled paper, which may contain any of all of the categories as well as other non-fibrous materials such as fillers and adhesives used to manufacture the original paper product may be used in the present web. In addition, fibers and/or filaments made from polymers, specifically hydroxyl polymers, may be used in the present invention. Non-limiting examples of suitable hydroxyl polymers include polyvinyl alcohol, starch, starch derivatives, chitosan, chitosan derivatives, cellulose derivatives, gums, arabinans, galactans, and combinations thereof. Additionally, other synthetic fibers such as rayon, polyethylene, and polypropylene fibers can be used within the scope of the present invention. Further, such fibers may be latex bonded. Other materials are also intended to be within the scope of the present invention as long as they do not interfere or counteract any advantage presented by the instant invention.

The absorbent paper products may comprise any tissue-towel paper product known in the industry. Embodiment of these absorbent paper products may be made according U.S. Pat. Nos. 4,191,609 4,300,981, 4,191,609, 4,514,345, 4,528, 239, 4,529,480, 4,637,859, 5,245,025, 5,275,700, 5,328,565, 5,334,289, 5,364,504, 5,527,428, 5,556,509, 5,628,876, 5,629,052, 5,637,194, and 5,411,636; EP 677612; and U.S. Patent App. No. 2004/0192136A1.

The absorbent paper products may be manufactured via a wet-laid making process where the resulting web is through-air-dried or conventionally dried. Optionally, the substrate may be foreshortened by creping or by wet microcontraction. Creping and/or wet microcontraction are disclosed in commonly assigned U.S. Pat. Nos. 6,048,938, 5,942,085, 5,865, 950, 4,440,597, 4,191,756, and 6,187,138.

Methods for making such absorbent paper products are known in the art. See commonly assigned U.S. Pat. No. 6,547, 928. One suitable absorbent paper product is pattern densified tissue paper which is characterized by having a relatively high-bulk field of relatively low fiber density and an array of densified zones of relatively high fiber density. The high-bulk field is alternatively characterized as a field of pillow regions. The densified zones are alternatively referred to as knuckle regions. The densified zones may be discretely spaced within the high-bulk field or may be interconnected, either fully or partially, within the high-bulk field. Processes for making pattern densified tissue webs are disclosed in U.S. Pat. Nos. 3,301,746, 3,974,025, 4,191,609, 4,637,859, 3,301,746, 3,821,068, 3,974,025, 3,573,164, 3,473,576, 4,239,065, and 4,528,239.

Uncompacted, non pattern-densified absorbent paper products are also contemplated within the scope of the present invention and are described in U.S. Pat. Nos. 3,812, 000 and 4,208,459. Uncreped tissue paper as defined in the art is also contemplated. The techniques to produce uncreped tissue in this manner are taught in the prior art. For example, European Patent Application Nos. 0 677 612A2 and 0 617 164 A1; and U.S. Pat. No. 5,656,132.

The substrate which comprises the absorbent paper product of the present invention may be cellulosic, non-cellulosic, or a combination of both. The substrate may be conventionally dried using one or more press felts or through-air dried. If the substrate which comprises the paper according to the present invention is conventionally dried, it may be conventionally dried using a felt which applies a pattern to the paper as taught by commonly assigned U.S. Pat. No. 5,556,509 and PCT Application WO 96/00812. The substrate which comprises the paper according to the present invention may also be through air dried. A suitable through air dried substrate may be made according to commonly assigned U.S. Pat. No. 4,191,609.

Other materials are also intended to be within the scope of the present invention as long as they do not interfere or counteract any advantage presented by the instant invention.

In one embodiment, the absorbent paper product has a basis weight of greater than about 20 lbs/3000 ft$^2$, in another embodiment from about 20 lbs/3000 ft$^2$ to about 50 lbs/3000 ft$^2$. In another embodiment the basis weight is about 30 lbs/ 3000 ft$^2$ to about 45 lbs/3000 ft$^2$, as measured by the Basis Weight Method described herein.

In one embodiment the absorbent paper product comprises a High Load Caliper of from about 10 mils to about 45 mils; in another embodiment from about 12 mils to about 30 mils; in another embodiment from about 19 mils to about 28 mils, and in another embodiment from about 20 mils to about 25 mils, as measured by the High Load Caliper Method described herein.

In one embodiment the absorbent paper product comprises a Flex Modulus from about 0.1 to about 1.2; in another embodiment from about 0.1 to about 0.3, as measured by the Flex Modulus Method described herein.

In one embodiment the absorbent paper product comprises a Compression Slope of from about 7 to about 30; in another embodiment from about 7 to about 25, and in yet another embodiment from about 8 to about 20, as measured by the Compression Slope Method described herein.

In one embodiment the absorbent paper product comprises a Wet Caliper of greater than about 18 or greater than about 25 mils; in another embodiment from about 18, 22, 27, 28 mils to about 30, 32, 35, 40 mils, as measured by the Wet Caliper Test Method as disclosed herein.

In still yet another embodiment, the absorbent paper product exhibits a sheet caliper or loaded caliper of at least about 29, in another embodiment from about 30 mils to about 50 mils, and/or from about 33 mils to about 45, as measured by the Sheet Caliper Test Method disclosed herein.

In one embodiment of the present invention, the absorbent paper product has a plurality of embossments. Suitable means of embossing include those disclosed in U.S. Pat. Nos. 3,323, 983, 5,468,323, 5,693,406, 5,972,466, 6,030,690, and 6,086, 715.

Absorbent Paper Product: Optional Ingredients

The absorbent paper product may optionally comprise one or more ingredients that may be added to the aqueous papermaking furnish or the embryonic web. These optional ingredients may be added to impart other desirable characteristics to the product or improve the papermaking process so long as they are compatible with the other components of the fibrous structure product and do not significantly and adversely affect the functional qualities of the present invention. The listing of optional chemical ingredients is intended to be merely exemplary in nature and is not meant to limit the scope of the invention. Other materials may be included as well so long as they do not interfere or counteract the advantages of the present invention.

A cationic charge biasing species may be added to the papermaking process to control the zeta potential of the aqueous papermaking furnish as it is delivered to the papermaking process. These materials are used because most of the solids in nature have negative surface charges, including the surfaces of cellulosic fibers and fines and most inorganic fillers. In one embodiment the cationic charge biasing species is alum. In addition charge biasing may be accomplished by use of relatively low molecular weight cationic synthetic polymer, in one embodiment having a molecular weight of no more than about 500,000 and in another embodiment no more than about 200,000, or even about 100,000. The charge densities of such low molecular weight cationic synthetic polymers are relatively high. These charge densities range from about 4 to about 8 equivalents of cationic nitrogen per kilogram of polymer. An exemplary material is Cypro 514®, a product of Cytec, Inc. of Stamford, Conn.

High surface area, high anionic charge microparticles for the purposes of improving formation, drainage, strength, and retention may also be included herein. See, for example, U.S. Pat. No. 5,221,435.

If permanent wet strength is desired, cationic wet strength resins may be optionally added to the papermaking furnish or to the embryonic web. From about 2 to about 50 lbs./ton of dry paper fibers of the cationic wet strength resin may be used, in another embodiment from about 5 to about 30 lbs./ton, and in another embodiment from about 10 to about 25 lbs./ton. The cationic wet strength resins useful in this invention include without limitation cationic water soluble resins. These resins impart wet strength to paper sheets and are well known to the paper making art. These resin may impart either temporary or permanent wet strength to the sheet. Such resins include the following Hercules products. KYMENE® resins obtainable from Hercules Inc., Wilmington, Del. may be used, including KYMENE® 736 which is a polyethyleneimine (PEI) wet strength polymer. It is believed that the PEI imparts wet strength by ionic bonding with the pulps carboxyl sites. KYMENE® 557LX is polyamide epichlorohydrin (PAE) wet strength polymer. It is believed that the PAE contains cationic sites that lead to resin retention by forming an ionic bond with the carboxyl sites on the pulp. The polymer contains 3-azetidinium groups which react to form covalent bonds with the pulps' carboxyl sites as well as with the polymer backbone. The product must undergo curing in the form of heat or undergo natural aging for the reaction of the azentidinium group. KYMENE® 450 is a base activated epoxide polyamide epichlorohydrin polymer. It is theorized that like 557LX the resin attaches itself ionically to the pulps' carboxyl sites. The epoxide group is much more reactive than the azentidinium group. The epoxide group reacts with both the hydroxyl and carboxyl sites on the pulp, thereby giving higher wet strengths. The epoxide group can also crosslink to the polymer backbone. KYMENE® 2064 is also a base activated epoxide polyamide epichlorohydrin polymer. It is theorized that KYMENE® 2064 imparts its wet strength by the same mechanism as KYMENE® 450. KYMENE® 2064 differs in that the polymer backbond contains more epoxide functional groups than does KYMENE® 450. Both KYMENE® 450 and KYMENE® 2064 require curing in the form of heat or natural aging to fully react all the epoxide groups, however, due to the reactiveness of the epoxide group, the majority of the groups (80-90%) react and impart wet strength off the paper machine. Mixtures of the foregoing may be used. Other suitable types of such resins include urea-formaldehyde resins, melamine formaldehyde resins, polyamide-epichlorohydrin resins, polyethyleneimine resins, polyacrylamide resins, dialdehyde starches, and mixtures thereof. Other suitable types of such resins are described in U.S. Pat. Nos. 3,700,623, 3,772,076, 4,557,801, 4,391,878.

In one embodiment, the cationic wet strength resin may be added at any point in the processes, where it will come in contact with the paper fibers prior to forming the wet web. For example, the cationic wet strength resin may be added to the thick or the thin stock directly, in may be added at the tray, the fan pump, the head box, the machine chest, the dump chest or the pulper. In another embodiment the cationic wet strength resin is added to the thick stock. It should be noted, however, that the optimal addition point may very from paper machine to paper machine and from grade of paper to grade of paper.

Many absorbent paper products must have limited strength when wet because of the need to dispose of them through toilets into septic or sewer systems. If wet strength is imparted to these products, fugitive wet strength, characterized by a decay of part or all of the initial strength upon standing in presence of water, is preferred. If fugitive wet strength is desired, the binder materials can be chosen from the group consisting of dialdehyde starch or other resins with aldehyde functionality such as Co-Bond 1000® offered by National Starch and Chemical Company of Scarborough, Me.; Parez 750® offered by Cytec of Stamford, Conn.; and the resin described in U.S. Pat. No. 4,981,577 and other such resins having the decay properties described above as may be known to the art.

If enhanced absorbency is needed, surfactants may be used to treat the absorbent paper product of the present invention. The level of surfactant, if used, in one embodiment, from about 0.01% to about 2.0% by weight, based on the dry fiber weight of the absorbent paper product. In one embodiment the surfactants have alkyl chains with eight or more carbon atoms. Exemplary anionic surfactants include linear alkyl sulfonates and alkylbenzene sulfonates. Exemplary nonionic surfactants include alkylglycosides including alkylglycoside esters such as Crodesta SL40® which is available from Croda, Inc. (New York, N.Y.); alkylglycoside ethers as described in U.S. Pat. No. 4,011,389; and alkylpolyethoxylated esters such as Pegosperse 200 mL available from Glyco Chemicals, Inc. (Greenwich, Conn.) and IGEPAL RC-520® available from Rhone Poulenc Corporation (Cranbury, N.J.). Alternatively, cationic softener active ingredients with a high degree of unsaturated (mono and/or poly) and/or branched chain alkyl groups can greatly enhance absorbency.

In addition, chemical softening agents may be used to increase the softness of the absorbent paper product. In one embodiment the chemical softening agents comprise quaternary ammonium compounds including, but not limited to, the well-known dialkyldimethylammonium salts (e.g., ditallowedimethylammonium chloride, ditallowedimethylammonium methyl sulfate ("DTDMAMS"), di(hydrogenated tallow)dimethyl ammonium chloride, etc.). In another embodiment variants of these softening agents include mono or diester variations of the before mentioned dialkyldimethylammonium salts and ester quaternaries made from the reaction of fatty acid and either methyl diethanol amine and/or triethanol amine, followed by quaternization with methyl chloride or dimethyl sulfate.

Another class of papermaking-added chemical softening agents comprises organo-reactive polydimethyl siloxane ingredients, including the amino functional polydimethyl siloxane. The absorbent paper product of the present invention may further comprise a diorganopolysiloxane-based polymer. These diorganopolysiloxane-based polymers useful in the present invention span a large range of viscosities; from about 10 to about 10,000,000 centistokes (cSt) at 25° C. Some diorganopolysiloxane-based polymers useful in this invention exhibit viscosities greater than 10,000,000 centistokes (cSt) at 25° C. and therefore are characterized by manufacturer specific penetration testing. Examples of this characterization are GE silicone materials SE 30 and SE 63 with penetration specifications of 500-1500 and 250-600 (tenths of a millimeter) respectively.

Among the diorganopolysiloxane polymers of the present invention are diorganopolysiloxane polymers comprising repeating units, where said units correspond to the formula $(R_2SiO)_n$, where R is a monovalent radical containing from 1 to 6 carbon atoms, in one embodiment selected from the group consisting of methyl, ethyl, propyl, isopropyl, butyl, isobutyl, t-butyl, amyl, hexyl, vinyl, allyl, cyclohexyl, amino alkyl, phenyl, fluoroalkyl and mixtures thereof. The diorganopoylsiloxane polymers which may be employed in the present invention may contain one or more of these radicals as substituents on the siloxane polymer backbone. The diorganopolysiloxane polymers may be terminated by triorganosilyl groups of the formula $(R'_3Si)$ where R' is a monovalent radical selected from the group consisting of radicals containing from 1-6 carbon atoms, hydroxyl groups, alkoxyl groups, and mixtures thereof. In one embodiment the silicone polymer is a higher viscosity polymers, e.g., poly(dimethylsiloxane), herein referred to as PDMS or silicone gum, having a viscosity of at least 100,000 cSt.

Silicone gums, optionally useful herein, correspond to the formula:

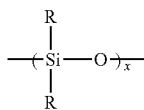

where R can be a methyl group.

Fluid diorganopolysiloxane polymers that are commercially available include SE 30 silicone gum and SF96 silicone fluid available from the General Electric Company. Similar materials can also be obtained from Dow Corning and from Wacker Silicones.

An additional fluid diorganosiloxane-based polymer optionally for use in the present invention is a dimethicone copolyol. The dimethicone copolyol can be further characterized as polyalkylene oxide modified polydimethysiloxanes, such as manufactured by the Witco Corporation under the trade name Silwet. Similar materials can be obtained from Dow Corning, Wacker Silicones and Goldschmidt Chemical Corporation as well as other silicone manufacturers. Silicones useful herein are further disclosed in U.S. Pat. Nos. 5,059,282; 5,164,046; 5,246,545; 5,246,546; 5,552,345; 6,238,682; 5,716,692.

The chemical softening agents are generally useful at a level of from about 0.05 lbs/ton to about 300 lbs/ton, in another embodiment from about 0.2 lbs/ton to about 60 lbs/ton, and in another embodiment from about 0.4 lbs/ton to about 6 lbs/ton.

Filler materials may also be incorporated into the absorbent paper products of the present invention. U.S. Pat. No. 5,611,890 discloses filled tissue-towel paper products that are acceptable as substrates for the present invention. In addition antibacterial agents, coloring agents such as print elements, perfumes, dyes, and mixtures thereof, may be included in the fibrous structure product of the present invention.

In one embodiment the primary product may be an absorbent paper product described in U.S. Provisional Patent App. Nos. 60/797,244 and 60/797,245.

Test Methods

The following describe the test methods utilized herein to determine the values consistent with those presented herein. All measurements for the test methods are made at 23+/−1° C. and 50% relative humidity, unless otherwise specified.

Flex Modulus

The Flex Modulus is a measurement of the bending stiffness of the absorbent paper product herein. The following procedure can be used to determine the bending stiffness of paper product. The Kawabata Evaluation System-2, Pure Bending Tester (i.e.; KES-FB2, manufactured by a Division of Instrumentation, Kato Tekko Company, Ltd. of Kyoto, Japan) may be used for this purpose.

Samples of the absorbent paper product to be tested are cut to approximately 20×20 cm in the machine and cross machine direction. The sample width is measured to 0.01 inches (0.025 cm). The outer ply (i.e.; the ply that is facing outwardly on a roll of the paper sample) and inner ply as presented on the roll are identified and marked.

The sample is placed in the jaws of the KES-FB2 Auto A such that the sample is first bent with the outer ply undergoing compression and the inner ply undergoing tension. In the orientation of the KES-FB2 the outer ply is right facing and the inner ply is left facing. The distance between the front moving jaw and the rear stationary jaw is 1 cm. The sample is secured in the instrument in the following manner. First the front moving chuck and the rear stationary chuck are opened to accept the sample. The sample is inserted midway between the top and bottom of the jaws such that the machine direction of the sample is parallel to the jaws (i.e.; vertical in the KES-FB2 holder).

The rear stationary chuck is then closed by uniformly tightening the upper and lower thumb screws until the sample is snug, but not overly tight. The jaws on the front stationary chuck are then closed in a similar fashion. The sample is adjusted for squareness in the chuck, then the front jaws are tightened to insure the sample is held securely. The distance (d) between the front chuck and the rear chuck is 1 cm.

The output of the instrument is load cell voltage (Vy) and curvature voltage (Vx). The load cell voltage is converted to a bending moment normalized for sample width (M) in the following manner:

$$\text{Moment}(M, \text{gf*cm/cm}) = (Vy * Sy * d)/W$$

where Vy is the load cell voltage; Sy is the instrument sensitivity in gf*cm/V; d is the distance between the chucks; and W is the sample width in centimeters.

The sensitivity switch of the instrument is set at 5×1. Using this setting the instrument is calibrated using two 50 gram weights. Each weight is suspended from a thread. The thread is wrapped around the bar on the bottom end of the rear stationary chuck and hooked to a pin extending from the front and back of the center of the shaft. One weight thread is wrapped around the front and hooked to the back pin. The other weight thread is wrapped around the back of the shaft and hooked to the front pin. Two pulleys are secured to the instrument on the right and left side. The top of the pulleys are horizontal to the center pin. Both weights are then hung over the pulleys (one on the left and one on the right) at the same time. The full scale voltage is set at 10 V. The radius of the center shaft is 0.5 cm. Thus the resultant full scale sensitivity (Sy) for the Moment axis is 100 gf*0.5 cm/10V (5 gf*cm/V).

The output for the Curvature axis is calibrated by starting the measurement motor and manually stopping the moving chuck when the indicator dial reaches the stop. The output voltage (Vx) is adjusted to 0.5 volts. The resultant sensitivity (Sx) for the curvature axis is 2/(volts*cm). The curvature (K) is obtained in the following manner:

$$\text{Curvature}(K, \text{cm}^{-1}) = Sx * Vx$$

where Sx is the sensitivity of the curvature axis; and Vx is the output voltage.

For determination of the bending stiffness the moving chuck is cycled from a curvature of 0 cm$^{-1}$ to +2.5 cm$^{-1}$ to −2.5 cm$^{-1}$ to 0 cm$^{-1}$ at a rate of 0.5 cm$^{-1}$/sec. Each sample is cycled once. The output voltage of the instrument is recorded in a digital format using a personal computer. At the start of the test there is no tension on the sample. As the test begins the load cell begins to experience a load as the sample is bent. The initial rotation is clockwise when viewed from the top down on the instrument.

The load continues to increase until the bending curvature reaches approximately +2.5 cm$^{-1}$ (this is the Forward Bend (FB)). At approximately +2.5 cm$^{-1}$ the direction of rotation was reversed. During the return the load cell reading decreases. This is the Forward Bend Return (FR). As the rotating chuck passes 0, curvature begins in the opposite direction. The Backward Bend (BB) and Backward Bend Return (BR) is obtained.

The data was analyzed in the following manner. A linear regression line is obtained between approximately 0.2 and 0.7 cm$^{-1}$ for the Forward Bend (FB). The slope of the line is reported as the Bending Stiffness (B) or Flex Modulus, in units of gf*cm$^2$/cm. The method is repeated with the sample oriented such that the cross direction is parallel to the jaws.

Three or more separate samples are run. The reported values are the averages of the BFB on the MD and CD samples. This method is also described in U.S. Pat. No. 6,602,577B1.

Basis Weight Method

Basis Weight is measured by preparing one or more samples of a certain area (3000 ft$^2$ or m$^2$) and weighing the sample(s) of a fibrous structure according to the present invention and/or an absorbent paper product comprising such fibrous structure on a top loading balance with a minimum resolution of 0.01 g. The balance is protected from air drafts and other disturbances using a draft shield. Weights are recorded when the readings on the balance become constant. The average weight (lbs or g) is calculated and the average area of the samples (3000 ft$^2$ or m$^2$). The basis weight (lbs/3000 ft$^2$ or g/m$^2$) is calculated by dividing the average weight (lbs or g) by the average area of the samples (3000 ft$^2$ or m$^2$). This method is herein referred to as the Basis Weight Method.

Sheet Caliper Method or Loaded Caliper Test Method

Samples are conditioned at 23+/−1° C. and 50% relative humidity for two hours prior to testing.

Sheet Caliper or Loaded Caliper of a sample of absorbent paper product is determined by cutting a sample of the fibrous structure product such that it is larger in size than a load foot loading surface where the load foot loading surface has a circular surface area of about 3.14 in$^2$. The sample is confined between a horizontal flat surface and the load foot loading surface. The load foot loading surface applies a confining pressure to the sample of 14.7 g/cm$^2$ (about 0.21 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated. The result is reported in mils.

Wet Caliper Test Method

Samples are conditioned at 23+/−1° C. and 50% relative humidity for two hours prior to testing.

Wet Caliper of a sample of fibrous structure product is determined by cutting a sample of the absorbent paper product such that it is larger in size than a load foot loading surface where the load foot loading surface has a circular surface area of about 3.14 in$^2$. Each sample is wetted by submerging the sample in a distilled water bath for 30 seconds. The caliper of the wet sample is measured within 30 seconds of removing the sample from the bath. The sample is then confined between a horizontal flat surface and the load foot loading surface. The load foot loading surface applies a confining pressure to the sample of 14.7 g/cm$^2$ (about 0.21 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated. The result is reported in mils.

High Load Caliper Method and Compression Slope Method

Caliper versus load data are obtained using a Thwing-Albert Model EJA Materials Tester, equipped with a 2000 g load cell and compression fixture. The compression fixture consisted of the following; load cell adaptor plate, 2000 gram overload protected load cell, load cell adaptor/foot mount 1.128 inch diameter presser foot, #89-14 anvil, 89-157 leveling plate, anvil mount, and a grip pin, all available from Thwing-Albert Instrument Company, Philadelphia, Pa. The compression foot is one square inch in area. The instrument is run under the control of Thwing-Albert Motion Analysis Presentation Software (MAP V1,1,6,9). A single sheet of a conditioned sample is cut to a diameter of approximately two inches. Samples are conditioned for a minimum of 2 hours at 23+/−1° C. and 50±2% relative humidity. Testing is carried out under the same temperature and humidity conditions. The sample must be less than 2.5-inch diameter (the diameter of the anvil) to prevent interference of the fixture with the sample. Care should be taken to avoid damage to the center portion of the sample, which will be under test. Scissors or other cutting tools may be used. For the test, the sample is centered on the compression table under the compression foot. The compression and relaxation data are obtained using a crosshead speed of 0.1 inches/minute. The deflection of the load cell is obtained by running the test without a sample being present. This is generally known as the Steel-to-Steel data. The Steel-to-Steel data are obtained at a crosshead speed of 0.005 in/min. Crosshead position and load cell data are recorded between the load cell range of 5 grams and 1500 grams for both the compression and relaxation portions of the test. Since the foot area is one square inch this corresponded to a range of 5 grams/sq in to 1500 grams/sq in. The maximum pressure exerted on the sample is 1500 g/sq in. At 1500 g/sq in the crosshead reverses its travel direction. Crosshead position values are collected at 31 selected load values during the test. These correspond to pressure values of 10, 25, 50, 75, 100, 125, 150, 200, 300, 400, 500, 600, 750, 1000, 1250, 1500, 1250, 1000, 750, 500, 400, 300, 250, 200, 150, 125, 100, 75, 50, 25, 10 g/sq. in. for the compression and the relaxation direction. During the compression portion of the test, crosshead position values are collected by the MAP software, by defining fifteen traps (Trap1 to Trap 15) at load settings of 10, 25, 50, 75, 100, 125, 150, 200, 300, 400, 500, 600, 750, 1000, 1250. During the return portion of the test, crosshead position values are collected by the MAP software, by defining fifteen return traps (Return Trap1 to Return Trap 15) at load settings of 1250, 1000, 750, 500, 400, 300, 250, 200, 150, 125, 100, 75, 50, 25, 10. The thirty-first trap is the trap at max load (1500 g). Again values are obtained for both the Steel-to-Steel and the sample. Steel-to-Steel values are obtained for each batch of testing. If multiple days are involved in the testing, the values are checked daily. The Steel-to-Steel values and the sample values are an average of four replicates (1500 g).

Caliper values are obtained by subtracting the average Steel-to-Steel crosshead trap values from the sample crosshead trap value at each trap point. For example, the values from two, three, or four individual replicates on each sample are averaged and used to obtain plots of the Caliper versus Load and Caliper versus Log(10) Load.

The Compression Slope is defined as the absolute value of the initial slope of the caliper versus Log(10)Load. The value is calculated by taking four data pairs from the compression direction of the curve that is, the caliper at 500, 600, 750, 1,000 or 750, 1,000, 1250, 1500, g/sq in at the start of the test. The pressure is converted to the Log(10) of the pressure. A least square regression is then obtained using the four pairs of caliper (y-axis) and Log(10) pressure (x-axis). The absolute value of the slope of the regression line is the Compression Slope. The units of the Compression Slope are mils/(log(10) g/sq in). For simplicity the Compression Slope is reported here without units. High Load Caliper is the average caliper at 1,500 g/sq. inch.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

It is noted that terms like "specifically," "preferably," "typically", "generally", and "often" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A paper towel product, for communicating qualities to a consumer of the paper towel product, comprising:

an absorbent paper product comprising two or more plies having a Compression Slope of from about 7 to about 30; a Basis Weight of from about 20 lbs/3000 ft$^2$ to about 50 lbs/3000 ft$^2$; a Wet Caliper of from about 18 mils to about 40 mils; and a Flex Modulus of from about 0.1 gf*cm$^2$/cm to about 1.2 gf*cm$^2$/cm;

a product packaging comprising a printed quality communicative indicium comprising a first part and a second part that are simultaneously visible on the product package and create a single communicative indicium, wherein the first part comprises a printed visual representation of the paper product and the second part comprises a printed visual representation of a sponge wherein the visual representation of said sponge is represented integrally and as a part of the visual representation of the paper product.

2. The product of claim 1 wherein the Compression Slope is from about 7 to about 25.

3. The product of claim 2 wherein the Compression Slope is from about 8 to about 20.

4. The product of claim 1 wherein the Flex Modulus is from about 0.1 gf*cm$^2$/cm to about 0.3 gf*cm$^2$/cm.

5. The product of claim 1 wherein the Wet Caliper is from about 19 mils to about 33 mils.

6. The product of claim 1 wherein the absorbent paper product further comprises a sheet caliper of at least about 29 mils.

7. The product of claim 1 wherein the absorbent paper product further comprises a chemical softening agent at a level of from about 0.01% to about 15% selected from the group consisting of quaternary ammonium compounds, organo-reactive polydimethyl siloxane compounds, and mixtures thereof.

8. The product of claim 1 wherein the absorbent paper product further comprises an embossment pattern and the visual representation of the paper product further comprises an embossing pattern that is visually similar to the embossment pattern on the absorbent paper product.

\* \* \* \* \*